(12) United States Patent
Wang et al.

(10) Patent No.: US 12,609,647 B2
(45) Date of Patent: Apr. 21, 2026

(54) MOTOR CONTROL CIRCUIT AND CONTROL METHOD

(71) Applicant: JIANGSU DONGCHENG TOOLS TECHNOLOGY CO., LTD., Nantong (CN)

(72) Inventors: Haodong Wang, Nantong (CN); Jianan Huang, Nantong (CN)

(73) Assignee: JIANGSU DONGCHENG TOOLS TECHNOLOGY CO., LTD., Nantong (CN)

( * ) Notice: Subject to any disclaimer, the term of this patent is extended or adjusted under 35 U.S.C. 154(b) by 205 days.

(21) Appl. No.: 18/522,309

(22) Filed: Nov. 29, 2023

(65) Prior Publication Data

US 2024/0097596 A1 Mar. 21, 2024

Related U.S. Application Data

(63) Continuation of application No. PCT/CN2022/141907, filed on Dec. 26, 2022.

(30) Foreign Application Priority Data

Jul. 6, 2022 (CN) .......................... 202210790112.6

(51) Int. Cl.
*H02P 6/16* (2016.01)
*H02P 6/08* (2016.01)
(Continued)

(52) U.S. Cl.
CPC ............ *H02P 27/085* (2013.01); *H02P 6/085* (2013.01); *H02P 6/182* (2013.01)

(58) Field of Classification Search
CPC ......... H02P 6/182; H02P 6/085; H02P 27/085
(Continued)

(56) References Cited

U.S. PATENT DOCUMENTS

2007/0164691 A1* 7/2007 MacKay ................. H02P 6/182
                                                          318/1
2008/0252238 A1 10/2008 Otaguro
(Continued)

FOREIGN PATENT DOCUMENTS

CN 1684355 A 10/2005
CN 101411054 A 4/2009
(Continued)

OTHER PUBLICATIONS

International Search Report, International Application No. PCT/CN2022/141907, mailed Feb. 22, 2023 (15 pages).
(Continued)

*Primary Examiner* — Gabriel Agared

(57) ABSTRACT

Disclosed are a motor control circuit and a control method. The control circuit includes: a power supply; a drive circuit; a pulse width modulation (PWM) signal generation circuit; a controller; and a reverse electromotive force detection circuit. The power supply is connected to the motor through the drive circuit; the drive circuit is connected to the controller through the PWM signal generation circuit; the controller is configured to control the drive circuit by changing a PWM signal frequency; the controller is connected to the motor through the reverse electromotive force detection circuit to obtain a reverse electromotive force parameter; the controller stores a correspondence between the reverse electromotive force parameter and the PWM signal frequency; the controller is further configured to receive the reverse electromotive force parameter and send the PWM signal frequency corresponding to the reverse electromotive force parameter to the drive circuit, for driving the motor.

18 Claims, 3 Drawing Sheets

(51) Int. Cl.
    *H02P 6/182*          (2016.01)
    *H02P 27/08*        (2006.01)

(58) Field of Classification Search
    USPC ........................................................ 318/459
    See application file for complete search history.

(56)             References Cited

U.S. PATENT DOCUMENTS

| | | | | |
|---|---|---|---|---|
| 2011/0084640 A1* | 4/2011 | Brown | ................... | H02P 6/185 |
| | | | | 318/400.35 |
| 2015/0188465 A1* | 7/2015 | Soh | ......................... | H02P 6/182 |
| | | | | 318/400.34 |
| 2016/0211781 A1* | 7/2016 | Jiang | ......................... | H02P 6/10 |
| 2017/0155347 A1* | 6/2017 | Park | ......................... | H02P 27/08 |
| 2018/0083557 A1* | 3/2018 | Kurosawa | .......... | G11B 19/2009 |

FOREIGN PATENT DOCUMENTS

| | | | |
|---|---|---|---|
| CN | 102088266 | A | 6/2011 |
| CN | 101411054 | B | 6/2012 |
| CN | 109921696 | A | 6/2019 |
| CN | 111022307 | A | 4/2020 |
| CN | 113422544 | A | 9/2021 |
| CN | 111657787 | B | 5/2022 |
| CN | 113422544 | B | 6/2022 |
| CN | 115459638 | A | 12/2022 |
| DE | 102017117109 | A1 | 1/2019 |

OTHER PUBLICATIONS

Chinese First Office Action, Chinese Application No. 202210790112.6, mailed Dec. 24, 2024 (13 pages).

* cited by examiner

MOTOR CONTROL CIRCUIT AND CONTROL METHOD

CROSS REFERENCE

The present application is a continuation-application of International (PCT) Patent Application No. PCT/CN2022/141907, filed on Dec. 26, 2022, which claims priority of Chinese Patent Application No. 202210790112.6 filed on Jul. 6, 2022, the entire contents of which are hereby incorporated by reference in its entirety.

TECHNICAL FIELD

The present disclosure relates to the field of motor control technologies, and in particular to a control circuit and a control method for PWM signals of a motor.

BACKGROUND

Existing brushless motors are generally adopted with pulse width modulation (PWM) drive, where when the motor speed is relatively low, a lower PWM frequency is applied, and when the motor speed increases, a higher PWM frequency is applied. This is because, in the non-inductive control of some brushless motors, there is a requirement for a minimum effective pulse width of the PWM startup and a minimum startup duty cycle of the PWM startup. For example: the startup duty cycle should not be greater than 10%, and the minimum pulse width is 10 us, then the PWM frequency at startup is required to be 10 KHz. However, when the motor is running normally at a very high speed, for example, more than 200,000 RPM, the frequency of 10 KHz cannot meet the running requirements. In order to enable the normal running of the motor, the PWM frequency is required to be increased to 20 KHz in this case. That is, the higher the motor speed is, the higher the PWM frequency is. However, for tools that realize constant speed control, when the speed is high and the torque is high, if the PWM frequency is still high and is not up to the full duty cycle, the power device driving the brushless motor will switch at a greater frequency, such that the loss will be very large and the temperature will be very high, which will affect the life of the power device.

Referring to Chinese Patent Issue No. CN111657787B, published on May 10, 2022, it is disclosed that the control unit sets the PWM frequency to be relatively less when the motor power (current value) detected by a current detection unit is relatively greater, and sets the PWM frequency to be relatively greater when the motor power (current value) detected is relatively less. The PWM frequency is set according to the result of comparison with the motor power and a power threshold value (current threshold value), thereby suppressing the switching loss of the switch element SW1. However, obtaining the motor power can only indirectly reflect the working condition of the motor and cannot accurately reflect the actual working condition of the motor, with poor accuracy.

Therefore, it is necessary to design a circuit and a method for controlling a motor, with high accuracy and low power consumption to solve the above problems.

SUMMARY OF THE DISCLOSURE

In view of the deficiencies of the related art, an object of the present disclosure is to provide a motor control circuit and a control method.

To solve the technical problem, the following technical solutions are adopted.

A motor control circuit, comprising: a positive terminal and a negative terminal of a power supply; a drive circuit; a pulse width modulation (PWM) signal generation circuit; a controller; and a reverse electromotive force detection circuit; wherein the positive terminal and the negative terminal are connected to the motor through the drive circuit; the drive circuit is connected to the controller through the PWM signal generation circuit; the controller is configured to control the drive circuit by changing a PWM signal frequency; wherein the controller is connected to the motor through the reverse electromotive force detection circuit to obtain a reverse electromotive force parameter; the controller stores a correspondence between the reverse electromotive force parameter and the PWM signal frequency; the controller is further configured to receive the reverse electromotive force parameter and send the PWM signal frequency corresponding to the reverse electromotive force parameter to the drive circuit, for driving the motor.

A motor control method, comprising: 1), setting a rotational speed of a motor; 2), obtaining, by a controller, a reverse electromotive force parameter through a reverse electromotive force detection circuit; and 3), comparing, by the controller, the reverse electromotive force parameter with a correspondence between the reverse electromotive force parameter and a PWM signal frequency, and selecting the PWM signal frequency corresponding to the reverse electromotive force parameter to a drive circuit, for driving the motor.

BRIEF DESCRIPTION OF THE DRAWINGS

Specific embodiments of the present disclosure are described in further detail below in conjunction with the accompanying drawings.

DETAILED DESCRIPTION

The present disclosure is described in further detail below in connection with the accompanying drawings and embodiments.

Figure 1:
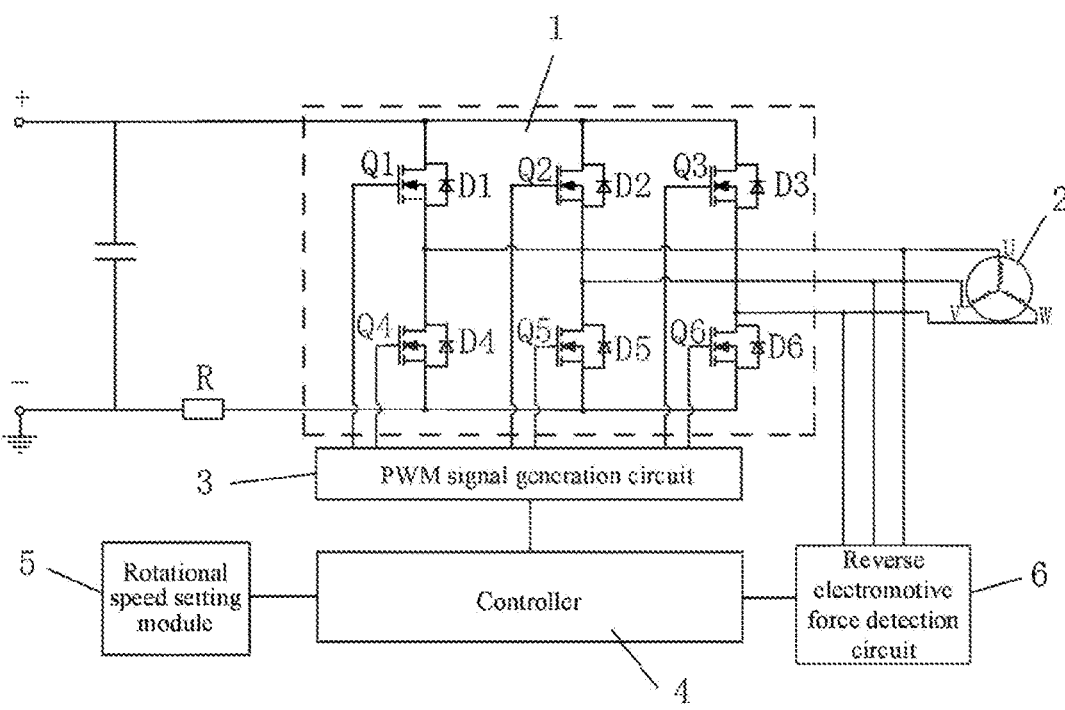
FIG. 1 is a circuit diagram of a motor control circuit according to the present disclosure.

Referring to FIG. 1, the present disclosure proposes a motor control circuit, including a positive terminal and a negative terminal of a power supply; where the positive terminal and the negative terminal are connected to a motor 2 through a drive circuit 1; the drive circuit 1 is connected to a controller 4 through a PWM signal generation circuit 3; a rotational speed setting module 5 is connected to the controller 4 configured for a user to select a suitable motor gear; the controller 4 is connected to the motor 2 through a reverse electromotive force detection circuit 6 to obtain a reverse electromotive force parameter; the controller 4 stores a correspondence between the reverse electromotive force parameter and a frequency of a PWM signal; the controller 4 is configured to receive the reverse electromotive force parameter and send a corresponding PWM signal to the drive circuit 1 to drive the motor 2.

The motor 2 is a brushless motor, and in this embodiment, a three-phase winding star-connected structure is taken as an example. The drive circuit 1 includes a first bridge arm, a second bridge arm, and a third bridge arm, each of the first bridge arm, the second bridge arm, and the third bridge arm being connected between the positive terminal and the negative terminal of the power supply. The first bridge arm includes a first switch tube Q1 (also referred to as an upper switch) and a fourth switch tube Q4 (also referred to as a lower switch) connected in series; the second bridge arm includes a second switch tube Q2 (also referred to as an upper switch) and a fifth switch tube Q5 (also referred to as a lower switch) connected in series; the third bridge arm includes a third switch tube Q3 (also referred to as an upper switch) and a sixth switch tube Q6 (also referred to as a lower switch) connected in series. Each of the first switch tube Q1, the second switch tube Q2, the third switch tube Q3, the fourth switch tube Q4, the fifth switch tube Q5, and the sixth switch tube Q6 is connected in parallel with a diode for current freewheeling. Three-phase windings U, V, and W of the motor 2 are connected to mid-points of each of the first bridge arm, the second bridge arm, and the third bridge arm, respectively.

The controller 4 is configured to send the PWM signal to the PWM signal generation circuit 3. The PWM signal generation circuit 3 is configured to control the upper switch tube of one of the first bridge arm, the second bridge arm, and the third bridge arm and the lower switch tube of another of the first bridge arm, the second bridge arm, and the third bridge arm of the drive circuit 1 to be conducted with each other, and the upper switch tube and lower switch tube of each of the first bridge arm, the second bridge arm, and the third bridge arm not to be conducted at the same time, thereby controlling two-phase windings to be turned on at a time. Therefore, the drive circuit 1 can control the conduction of the switch tubes in the following six states respectively: Q1Q5 conduction, Q1Q6 conduction, Q2Q4 conduction, Q2Q6 conduction, Q3Q4 conduction, Q3Q5 conduction, and the corresponding windings UV, UW, VU, VW, WU, WV are energized sequentially. That is, the phase change of the motor 2 is realized by switching of the six states, such that the electric current flows in a sequential manner through each coil. The magnetic field generated by the flow of current through the coils interacts with the permanent magnets of the rotor, and the magnetic poles of the rotor are changed so as to rotate. The reverse electromotive force detection circuit 6 is configured to detect the reverse electromotive force of a suspended phase winding. Since energy exists on the winding when the phase is changed, current freewheeling is required through the corresponding diode to consume the energy, and the duration of the current freewheeling varies according to different load conditions. The PWM signal includes an ON phase and an OFF phase, the duration of one ON phase and the duration of one OFF phase is a period of the PWM signal, and the reciprocal of the period is the frequency. That is, the controller 4 varies the frequency of the PWM signal by means of the reverse electromotive force parameter.

Figure 2:
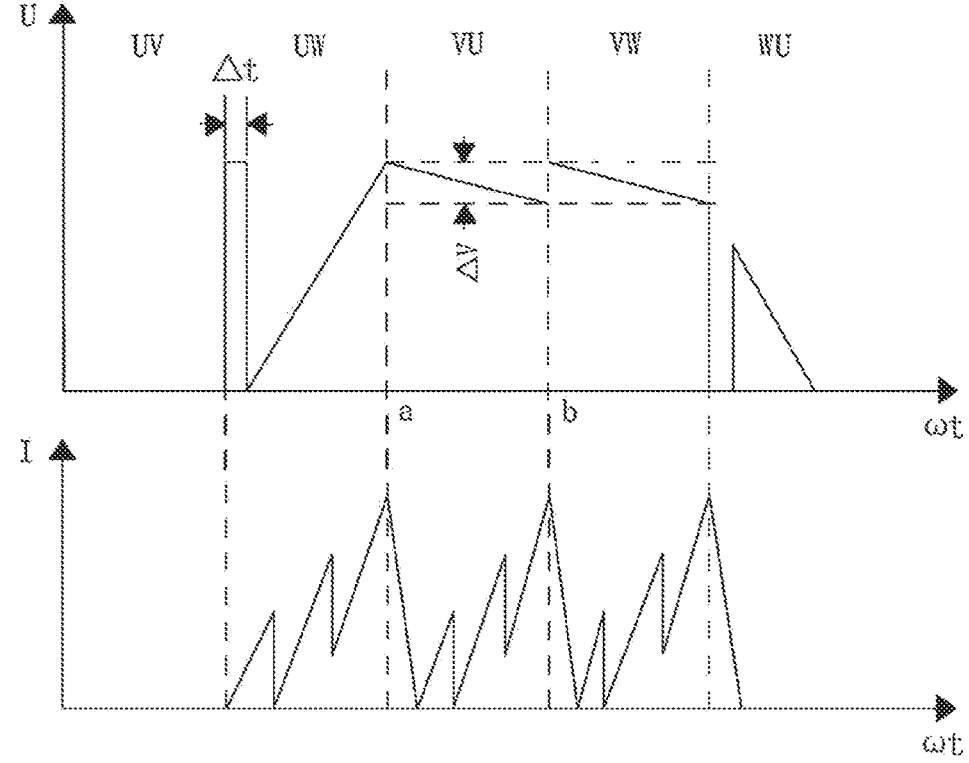
FIG. 2 is a waveform diagram of reverse electromotive force and bus bar current of a motor according to the present disclosure.
Figure 3:
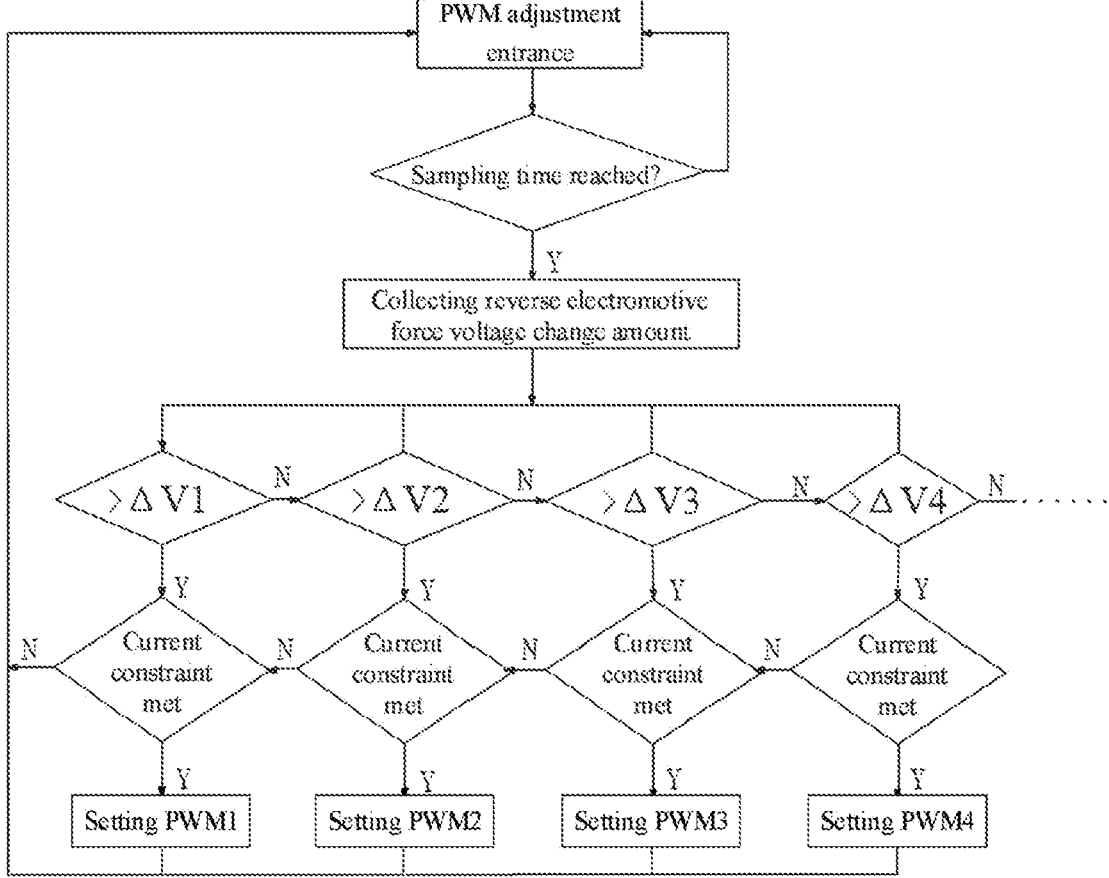
FIG. 3 is a control flowchart according to a first embodiment of the present disclosure.

Referring to FIGS. 2 and 3, FIG. 2 is a waveform diagram of reverse electromotive force and bus bar current of the C-phase winding of the motor, and FIG. 3 is a control flowchart according to a first embodiment of the present disclosure. In the present embodiment, the instantaneous current increases due to the increase of the load, and the voltage drop flowing through the switch tube will be greater, i.e., there will be a change in a reverse electromotive force voltage. The reverse electromotive force parameter includes a reverse electromotive force voltage change amount, the reverse electromotive force voltage change amount is a difference between reverse electromotive force voltages collected at every two adjacent phase-change times, and the correspondence between the reverse electromotive force parameter and the frequency of the PWM signal includes multiple voltage change amount thresholds and corresponding frequencies of the PWM signal stored in the controller 4. The multiple voltage change amount thresholds include a first voltage change amount threshold and a second voltage change amount threshold, a first PWM signal frequency corresponding to the first voltage change amount threshold, and a second PWM signal frequency corresponding to the second voltage change amount threshold. The first voltage change amount threshold is greater than the second voltage change amount threshold, and the first PWM signal frequency is less than the second PWM signal frequency. When the reverse electromotive force voltage change amount is greater than the first voltage change amount threshold, the controller 4 outputs the first PWM signal frequency to the drive circuit 1; when the reverse electromotive force voltage change amount is greater than the second voltage change amount threshold, the controller 4 outputs the second PWM signal frequency to the drive circuit 1.

The specific control process includes: Step 1, setting the rotational speed through the rotational speed setting module 5, and activating the motor to operate with an initial PWM signal; Step 2, entering a PWM adjustment entrance for PWM signal frequency adjustment; Step 3, determining whether a sampling time is reached, and when the sampling time is reached, proceeding to Step 4, collecting the reverse electromotive force voltage change amount, such as a difference between reverse electromotive force voltages corresponding to a phase change time a and a phase change time b; Step 5, sequentially comparing the reverse electromotive force voltage change amount with the voltage change thresholds, and when the reverse electromotive force voltage change amount is greater than the first voltage change threshold value $\Delta$ V1, such as 3V, determining whether a current constraint is met, which is the following.

$$\frac{1}{F_{pwm}} = T_{pwm} \tag{1}$$

$$\frac{60/(N \times p)}{6} = T_m \tag{2}$$

$$T_{pwm} \leq T_m \times \text{duty} \tag{3}$$

where: $F_{pwm}$ is the frequency of the PWM signal; $T_{pwm}$ is the period of the PWM signal; duty is the duty cycle of the PWM signal; N is the current mechanical rotational speed of the motor; p is the number of terminal pairs of the motor; $T_m$ is the current sector time of the motor.

When the current constraint is met, setting a corresponding frequency PWM1 of the PWM signal, such as 12500 Hz, to the drive circuit 1, and returning to Step 2 of entering the PWM adjustment entrance to continue collection; when the current constraint is not met, directly returning to Step 2; when the reverse electromotive force voltage change amount $\Delta$V is less than or equal to the first voltage change threshold $\Delta$V1, determining whether the reverse electromotive force voltage change amount $\Delta$V is greater than the second voltage variation threshold $\Delta$V2, such as 2V; when the reverse electromotive force voltage change amount $\Delta$V is greater than the second voltage variation threshold $\Delta$V2, determining whether the current constraint is met; when the current constraint is met, setting a corresponding frequency PWM2 of the PWM signal, such as 16000 Hz, and returning to Step 2; when the reverse electromotive force voltage change amount ΔV is less than or equal to the second voltage variation threshold ΔV2, continuing to determine whether the reverse electromotive force voltage change amount ΔV is greater than a third voltage variation threshold ΔV3, and so on. When none of the comparisons are satisfied, i.e., when the reverse electromotive force voltage change amount ΔV is still less than a minimum voltage change amount threshold, setting the initial PWM signal.

In another implementation, the correspondence between the reverse electromotive force parameter and the frequency of the PWM signal may include a corresponding functional relationship between the reverse electromotive force voltage change amount and the frequency of the PWM signal, the functional relationship being determined by means of testing or simulation to be $F_{pwm}=f(\Delta V)$. The frequency of the PWM signal has an inverse relationship with the reverse electromotive force voltage change amount, i.e., the greater the reverse electromotive force voltage change amount is, the less the frequency of the PWM signal is.

In another implementation, the correspondence between the reverse electromotive force parameter and the frequency of the PWM signal includes a corresponding table relationship between the set rotational speed, the reverse electromotive force voltage change amount, and the frequency of the PWM signal. That is, under the set rotational speed, the frequency of the PWM signal can be correspondingly selected according to a certain reverse electromotive force voltage change amount. Of course, the values in the table may be more refined, e.g., when the reverse electromotive force voltage change amount is less than the minimum voltage change amount threshold value, the initial PWM signal is set. The table may be shown below.

|  | ΔV1 = 3 V | ΔV2 = 2 V | ΔV3 = 1 V | . . . |
|---|---|---|---|---|
| 80000 RPM | 12500 Hz | 16000 Hz | 20000 Hz | . . . |
| 67500 RPM | 11500 Hz | 14500 Hz | 17500 Hz | . . . |
| 55000 RPM | 10000 Hz | 12500 Hz | 16000 Hz | . . . |

Figure 4:
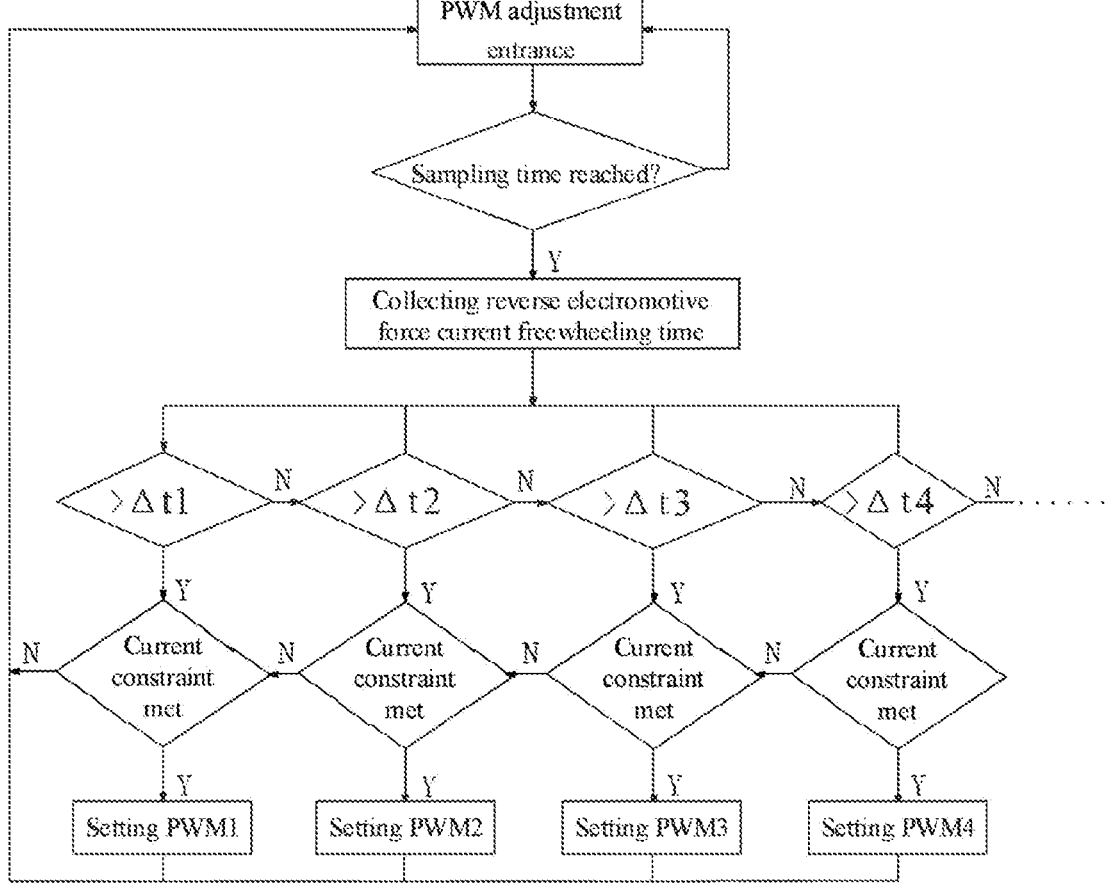
FIG. 4 is a control flowchart according to a second embodiment of the present disclosure.

Referring to FIGS. 2 and 4, FIG. 2 is a waveform diagram of reverse electromotive force and bus bar current of the C-phase winding of the motor, and FIG. 4 is a control flowchart according to a second embodiment of the present disclosure. In the present embodiment, the reverse electromotive force parameter includes multiple current freewheeling time thresholds and corresponding frequencies of the PWM signal stored in the controller 4. The multiple current freewheeling time thresholds includes a first current freewheeling time threshold and a second current freewheeling time threshold, a first PWM signal frequency corresponding to the first current freewheeling time threshold, and a second PWM signal frequency corresponding to the second current freewheeling time threshold. The first current freewheeling time threshold is greater than the second current freewheeling time threshold, and the first PWM signal frequency is less than the second PWM signal frequency. When the current freewheeling time is greater than the first current freewheeling time threshold, the controller 4 outputs the first PWM signal frequency to the drive circuit 1; when the current freewheeling time is greater than the second current freewheeling time threshold, the controller 4 outputs the second PWM signal frequency to the drive circuit 1.

The specific control process includes: Step 1, setting the rotational speed through the rotational speed setting module 5, and activating the motor to operate with an initial PWM signal; Step 2, entering a PWM adjustment entrance for PWM signal frequency adjustment; Step 3, determining whether a sampling time is reached, and when the sampling time is reached, proceeding to Step 4, collecting the current freewheeling time; Step 5, sequentially comparing the current freewheeling time Δt with the current freewheeling time thresholds, and when the current freewheeling time Δt is greater than the first current freewheeling time threshold Δt1, such as 40 us, determining whether a current constraint is met, which is the following.

$$\frac{1}{F_{pwm}} = T_{pwm} \tag{1}$$

$$\frac{60/(N \times p)}{6} = T_m \tag{2}$$

$$T_{pwm} \le T_m \times \text{duty} \tag{3}$$

where: $F_{pwm}$ is the frequency of the PWM signal; $T_{pwm}$ is the period of the PWM signal; duty is the duty cycle of the PWM signal; N is the current mechanical rotational speed of the motor; p is the number of terminal pairs of the motor; $T_m$ is the current sector time of the motor.

When the current constraint is met, setting a corresponding frequency PWM1 of the PWM signal, e.g., 12500 Hz, to the driver circuit 1, and returning to step 2 of entering the PWM adjustment entrance to continue collection; when the current constraint is not met, directly returning to Step 2; when the current freewheeling time Δt is less than or equal to the first current freewheeling time threshold Δt1, determining whether the current freewheeling time Δt is greater than the second current freewheeling time threshold Δt2, such as 35 us; when the current freewheeling time Δt is greater than the second current freewheeling time threshold Δt2, determining whether the current constraint is met; when the current constraint is met, setting a corresponding frequency PWM2 of the PWM signal, such as 16000 Hz, and returning to Step 2; when the current freewheeling time Δt is less than or equal to the second current freewheeling time threshold Δt2, continuing to determine whether the current freewheeling time Δt is greater than a third current freewheeling time threshold Δt3, and so on. When none of the comparisons are satisfied, i.e., when the current freewheeling time is still less than a minimum current freewheeling time threshold, setting the initial PWM signal.

In another implementation, the correspondence between the reverse electromotive force parameter and the frequency of the PWM signal may include a corresponding functional relationship between the current freewheeling time and the frequency of the PWM signal, the functional relationship being determined by means of testing or simulation to be $F_{pwm}=f(\Delta t)$. The frequency of the PWM signal has an inverse relationship with the current freewheeling time, i.e., the greater the current freewheeling time is, the less the frequency of the PWM signal is.

In another implementation, the correspondence between the reverse electromotive force parameter and the frequency of the PWM signal includes a corresponding table relationship between the set rotational speed, the current freewheeling time, and the frequency of the PWM signal. That is, under the set rotational speed, the frequency of the PWM signal can be correspondingly selected according to a certain current freewheeling time. Of course, the values in the table can be more refined, e.g., when the current freewheeling time is less than the minimum current freewheeling time threshold, the initial PWM signal is set. The table may be shown below.

|            | Δt1 = 40 us | Δt2 = 35 us | Δt3 = 30 us | . . . |
|------------|-------------|-------------|-------------|-------|
| 80000 RPM  | 12500 Hz    | 16000 Hz    | 20000 Hz    | . . . |
| 67500 RPM  | 11500 Hz    | 14500 Hz    | 17500 Hz    | . . . |
| 55000 RPM  | 10000 Hz    | 12500 Hz    | 16000 Hz    | . . . |

In the present disclosure, the controller is connected to the motor through the reverse electromotive force detection circuit for obtaining the reverse electromotive force parameter. The controller stores the correspondence between the reverse electromotive force parameter and the frequency of the PWM signal, and the controller is configured to receive the reverse electromotive force parameter and send the corresponding PWM signals to the drive circuit to drive the motor, which directly obtains the parameter of the motor in order to change the signals of the drive motor, satisfying the normal operation of the motor in the high speed and heavy load, with high accuracy and low power consumption.

The present disclosure is not limited to the above specific embodiments. Those skilled in the art can easily understand that, without departing from the principles and scope of the present disclosure, the motor control circuit and control method of the present disclosure have many other alternative solutions. The scope of the present disclosure is subject to the contents of the claims.

What is claimed is:

1. A motor control circuit, comprising:
a positive terminal and a negative terminal of a power supply;
a drive circuit;
a pulse width modulation (PWM) signal generation circuit;
a controller; and
a reverse electromotive force detection circuit;
wherein the positive terminal and the negative terminal are connected to a motor through the drive circuit; the drive circuit is connected to the controller through the PWM signal generation circuit; the controller is configured to control the drive circuit by changing a PWM signal frequency;
wherein the controller is connected to the motor through the reverse electromotive force detection circuit to obtain a reverse electromotive force parameter; the controller stores a correspondence between the reverse electromotive force parameter and the PWM signal frequency; the controller is further configured to receive the reverse electromotive force parameter and send the PWM signal frequency corresponding to the reverse electromotive force parameter to the drive circuit, for driving the motor;
wherein the motor comprises a three-phase winding structure, and the controller is configured to control a two-phase winding of the three-phase winding structure to be turned on; the reverse electromotive force detection circuit is configured to detect reverse electromotive force of a suspended phase winding of the three-phase winding structure; the reverse electromotive force parameter comprises a reverse electromotive force voltage change amount, the reverse electromotive force voltage change amount being a difference between reverse electromotive force voltages collected at every two adjacent phase-change times.

2. The motor control circuit according to claim 1, wherein the correspondence between the reverse electromotive force parameter and the PWM signal frequency comprises a plurality of voltage change amount thresholds and a plurality of the PWM signal frequencies corresponding to the plurality of voltage change amount thresholds stored in the controller; the plurality of voltage change amount thresholds comprise a first voltage change amount threshold and a second voltage change amount threshold; the plurality of PWM signal frequencies comprise a first PWM signal frequency corresponding to the first voltage change amount threshold and a second PWM signal frequency corresponding to the second voltage change amount threshold; the first voltage change amount threshold is greater than the second voltage change amount threshold, and the first PWM signal frequency is less than the second PWM signal frequency; in response to the reverse electromotive force voltage change amount being greater than the first voltage change amount threshold, the controller outputs the first PWM signal frequency to the drive circuit; in response to the reverse electromotive force voltage change amount being less than or equal to the first voltage change amount threshold and greater than the second voltage change amount threshold, the controller outputs the second PWM signal frequency to the drive circuit.

3. The motor control circuit according to claim 1, wherein the correspondence between the reverse electromotive force parameter and the PWM signal frequency comprises a functional relationship between the reverse electromotive force voltage change amount and the PWM signal frequency, the functional relationship being represented as $F_{pwm}=f(\Delta V)$, where $F_{pwm}$ is the PWM signal frequency, and $\Delta V$ is the reverse electromotive force voltage change amount; there is an inverse relationship between the PWM signal frequency and the reverse electromotive force voltage change amount.

4. The motor control circuit according to claim 1, wherein the correspondence between the reverse electromotive force parameter and the PWM signal frequency comprises a corresponding relationship between a set rotational speed, the reverse electromotive force voltage change amount, and the PWM signal frequency.

5. The motor control circuit according to claim 1, wherein the motor comprises a three-phase winding structure, and the controller is configured to control a two-phase winding of the three-phase winding structure to be turned on; the reverse electromotive force detection circuit is configured to detect reverse electromotive force of a suspended phase winding of the three-phase winding structure; the reverse electromotive force parameter comprises a reverse electromotive force current freewheeling time, the reverse electromotive force current freewheeling time being a current freewheeling time generated at each phase change.

6. The motor control circuit according to claim 5, wherein the correspondence between the reverse electromotive force parameter and the PWM signal frequency comprises a plurality of current freewheeling time thresholds and a plurality of the PWM signal frequencies corresponding to the plurality of current freewheeling time thresholds stored in the controller; the plurality of current freewheeling time thresholds comprise a first current freewheeling time threshold and a second current freewheeling time threshold; the plurality of PWM signal frequencies comprise a third PWM signal frequency corresponding to the first current freewheeling time threshold and a fourth PWM signal frequency corresponding to the second current freewheeling time threshold; the first current freewheeling time threshold is greater than the second current freewheeling time threshold, and the third PWM signal frequency is less than the fourth PWM signal frequency; in response to the reverse electromotive force current freewheeling time being greater than the first current freewheeling time threshold, the controller outputs the third PWM signal frequency to the drive circuit; in response to the reverse electromotive force current freewheeling time being less than or equal to the first current freewheeling time threshold and greater than the second current freewheeling time threshold, the controller outputs the fourth PWM signal frequency to the drive circuit.

7. The motor control circuit according to claim 5, wherein the correspondence between the reverse electromotive force parameter and the PWM signal frequency comprises a functional relationship between the reverse electromotive force current freewheeling time and the PWM signal frequency, the functional relationship being represented as $F_{pwm}=f(\Delta t)$, where $F_{pwm}$ is the PWM signal frequency, and $\Delta t$ is the reverse electromotive force current freewheeling time; there is an inverse relationship between the PWM signal frequency and the reverse electromotive force current freewheeling time.

8. The motor control circuit according to claim 5, wherein the correspondence between the reverse electromotive force parameter and the PWM signal frequency comprises a corresponding relationship between a set rotational speed, the reverse electromotive force current freewheeling time, and the PWM signal frequency.

9. A motor control method, comprising:

1), setting a rotational speed of a motor;

2), obtaining, by a controller, a reverse electromotive force parameter through a reverse electromotive force detection circuit; and 3), comparing, by the controller, the reverse electromotive force parameter with a correspondence between the reverse electromotive force parameter and a PWM signal frequency, and selecting the PWM signal frequency corresponding to the reverse electromotive force parameter to a drive circuit, for driving the motor;

wherein the motor comprises a three-phase winding structure, and the controller is configured to control a two-phase winding of the three-phase winding structure to be turned on; the reverse electromotive force detection circuit is configured to detect reverse electromotive force of a suspended phase winding of the three-phase winding structure; the reverse electromotive force parameter comprises a reverse electromotive force voltage change amount, the reverse electromotive force voltage change amount being a difference between reverse electromotive force voltages collected at every two adjacent phase-change times.

10. The motor control method according to claim 9, wherein the correspondence between the reverse electromotive force parameter and the PWM signal frequency comprises a plurality of voltage change amount thresholds and a plurality of the PWM signal frequencies corresponding to the plurality of voltage change amount thresholds stored in the controller; the plurality of voltage change amount thresholds comprise a first voltage change amount threshold and a second voltage change amount threshold; the plurality of PWM signal frequencies comprise a first PWM signal frequency corresponding to the first voltage change amount threshold and a second PWM signal frequency corresponding to the second voltage change amount threshold; the first voltage change amount threshold is greater than the second voltage change amount threshold, and the first PWM signal frequency is less than the second PWM signal frequency;

wherein the comparing, by the controller, the reverse electromotive force parameter with a correspondence between the reverse electromotive force parameter and the PWM signal frequency, and selecting the PWM signal frequency corresponding to the reverse electromotive force parameter to the drive circuit comprise:

in response to the reverse electromotive force voltage change amount being greater than the first voltage change amount threshold, outputting, by the controller, the first PWM signal frequency to the drive circuit; and in response to the reverse electromotive force voltage change amount being less than or equal to the first voltage change amount threshold and greater than the second voltage change amount threshold, outputting, by the controller, the second PWM signal frequency to the drive circuit.

11. The motor control method according to claim 9, wherein the correspondence between the reverse electromotive force parameter and the PWM signal frequency comprises a functional relationship between the reverse electromotive force voltage change amount and the PWM signal frequency, the functional relationship being represented as $F_{pwm}=f(\Delta V)$, where $F_{pwm}$ is the PWM signal frequency, and $\Delta V$ is the reverse electromotive force voltage change amount; there is an inverse relationship between the PWM signal frequency and the reverse electromotive force voltage change amount.

12. The motor control method according to claim 9, wherein the correspondence between the reverse electromotive force parameter and the PWM signal frequency comprises a corresponding relationship between a set rotational speed, the reverse electromotive force voltage change amount, and the PWM signal frequency.

13. The motor control method according to claim 10, wherein the motor is operated at an initial PWM signal frequency under the set rotational speed;

the comparing, by the controller, the reverse electromotive force parameter with a correspondence between the reverse electromotive force parameter and the PWM signal frequency, and selecting the PWM signal frequency corresponding to the reverse electromotive force parameter to the drive circuit comprise:

in response to the reverse electromotive force voltage change amount being less than or equal to the second voltage change amount threshold, outputting, by the controller, the initial PWM signal frequency to the drive circuit.

14. The motor control method according to claim 9, wherein the motor comprises a three-phase winding structure, and the controller is configured to control a two-phase winding of the three-phase winding structure to be turned on; the reverse electromotive force detection circuit is configured to detect reverse electromotive force of a suspended phase winding of the three-phase winding structure; the reverse electromotive force parameter comprises a reverse electromotive force current freewheeling time, the reverse electromotive force current freewheeling time being a current freewheeling time generated at each phase change.

15. The motor control method according to claim 14, wherein the correspondence between the reverse electromotive force parameter and the PWM signal frequency comprises a plurality of current freewheeling time thresholds and a plurality of the PWM signal frequencies corresponding to the plurality of current freewheeling time thresholds stored in the controller; the plurality of current freewheeling time thresholds comprise a first current freewheeling time threshold and a second current freewheeling time threshold; the plurality of PWM signal frequencies comprise a third PWM signal frequency corresponding to the first current freewheeling time threshold and a fourth PWM signal frequency corresponding to the second current freewheeling time threshold; the first current freewheeling time threshold is greater than the second current freewheeling time threshold, and the third PWM signal frequency is less than the fourth PWM signal frequency;

wherein the comparing, by the controller, the reverse electromotive force parameter with a correspondence between the reverse electromotive force parameter and the PWM signal frequency, and selecting the PWM signal frequency corresponding to the reverse electromotive force parameter to the drive circuit comprise:

in response to the reverse electromotive force current freewheeling time being greater than the first current freewheeling time threshold, outputting, by the controller, the third PWM signal frequency to the drive circuit; and in response to the reverse electromotive force current freewheeling time being less than or equal to the first current freewheeling time threshold and greater than the second current freewheeling time threshold, outputting, by the controller, the fourth PWM signal frequency to the drive circuit.

16. The motor control method according to claim 14, wherein the correspondence between the reverse electromotive force parameter and the PWM signal frequency comprises a functional relationship between the reverse electromotive force current freewheeling time and the PWM signal frequency, the functional relationship being represented as $F_{pwm}=f(\Delta t)$, where $F_{pwm}$ is the PWM signal frequency, and $\Delta t$ is the reverse electromotive force current freewheeling time; there is an inverse relationship between the PWM signal frequency and the reverse electromotive force current freewheeling time.

17. The motor control method according to claim 14, wherein the correspondence between the reverse electromotive force parameter and the PWM signal frequency comprises a corresponding relationship between a set rotational speed, the reverse electromotive force current freewheeling time, and the PWM signal frequency.

18. The motor control method according to claim 15, wherein the motor is operated at an initial PWM signal frequency under the set rotational speed;

the comparing, by the controller, the reverse electromotive force parameter with a correspondence between the reverse electromotive force parameter and the PWM signal frequency, and selecting the PWM signal frequency corresponding to the reverse electromotive force parameter to the drive circuit comprise:

in response to the reverse electromotive force current freewheeling time being less than or equal to the second current freewheeling time threshold, outputting, by the controller, the initial PWM signal frequency to the drive circuit.

* * * * *